United States Patent [19]

Ojima

[11] Patent Number: 5,659,442
[45] Date of Patent: Aug. 19, 1997

[54] APPARATUS AND METHOD FOR LOADING CARTRIDGE INTO DECK

[75] Inventor: Kenichi Ojima, Tokyo, Japan

[73] Assignee: NEC Corporation, Tokyo, Japan

[21] Appl. No.: 670,790

[22] Filed: Jun. 24, 1996

[30] Foreign Application Priority Data

Jun. 29, 1995 [JP] Japan .................... 7-164311

[51] Int. Cl.⁶ .................... G11B 5/008
[52] U.S. Cl. .................... 360/96.5
[58] Field of Search .................... 360/96.5

[56] References Cited

U.S. PATENT DOCUMENTS 5,018,031  5/1991  Wada .................... 360/96.5
5,119,251  6/1992  Matsuda .................... 360/96.5

*Primary Examiner*—John H. Wolff
*Attorney, Agent, or Firm*—Young & Thompson

[57] ABSTRACT

The present invention provides an apparatus for loading a cartridge into a deck, including (a) a cartridge tray designed to be movable relative to a deck and formed at a bottom surface thereof with a through hole, a cartridge being adapted to be placed on the cartridge tray, the cartridge being formed at a lower surface with a positioning groove into which a pin projecting from the deck is to be fit through the through hole of the cartridge tray when the cartridge tray is caused to move to the deck, (b) an arm plate designed to be movable towards the deck, (c) a mechanism for causing the arm plate to make contact with the cartridge and push the cartridge towards the deck until the pin fits into the positioning groove of the cartridge, and a device for making contact with the cartridge before the arm plate makes contact with the cartridge, and pushing the cartridge towards the deck before the motor crank causes the arm plate to push the cartridge towards the deck. For instance, the device includes a block disposed at a lower level than the arm plate, and a rod having resiliency which is connected at one end thereof to the block and fixedly connected at the other end thereof to the arm plate. The apparatus makes it possible to smoothly fit the pin into the positioning groove of the cartridge, and hence load the cartridge into the deck without failing for the pin to fit into the positioning groove and thus the cartridge being stuck on the pin.

14 Claims, 4 Drawing Sheets

APPARATUS AND METHOD FOR LOADING CARTRIDGE INTO DECK

BACKGROUND OF THE INVENTION

1. Field of the Invention

The invention relates to an apparatus and a method for loading a wound magnetic tape containing cartridge into a deck.

2. Description of the Related Art

FIGS. 1 and 2 illustrate one of conventional apparatuses for loading a cartridge into a deck. The illustrated apparatus includes a cartridge tray 10 on which a cartridge 11 is to be mounted. Below the cartridge tray 10 is located a deck 12 to which a pair of springs 13a and 13b are secured. The cartridge tray 10 is supported by the springs 13a and 13b, and hence the cartridge tray 10 can move towards and away from the deck 12.

The cartridge 11 is formed at a lower surface thereof with circular positioning grooves 14 (only one of them is illustrated in FIGS. 1 and 2) so that the cartridge 11 is correctly loaded into the deck 12. As illustrated in FIGS. 1 and 2, a pin 15 stands on the deck 12. In normal state, namely, while the cartridge 11 is not being pushed downwardly, the pin 15 is always below the cartridge tray 10. The cartridge tray 10 is formed at a bottom surface thereof with a through hole 16. As later mentioned in detail, when the cartridge 11 is pushed downwardly towards the deck 12, the pin 15 projecting from the deck 12 fits into the positioning groove 14 of the cartridge 11 through the through hole 16. Thus, the cartridge 11 is loaded into the deck 12 in place.

Above the cartridge 11 is located an arm plate 17 which is connected at one end 17a thereof to a sidewall 10a of the cartridge tray 10 so that the arm plate 17 is able to swing about the end 17a.

Above the arm plate 17 is located an arc-shaped motor crank 18 which is connected at a point 18a thereof to a motor 19, and thus the motor crank 18 is rotated about the point 18a while the motor 19 is kept on. A motor arm 20 is rotatably connected at one end 20a thereof to the motor crank 18, and also rotatably connected at the other end 20b thereof to a tension arm 21.

The arm plate 17 is formed at an upper surface thereof with a hollow cylinder 17b. The tension arm 21 passes through the hollow cylinder 17b so that the tension arm 21 is able to make slide movement through the cylinder 17b. The tension arm 21 is designed to pivot about a point 21a. Thus, when the tension arm 21 pivots about the point 21a thereof, the arm plate 17 is caused to rotate about the end 17a thereof together with the tension arm 21 which makes slight slide movement relative to the arm plate 17 within the cylinder 17b.

The tension arm 21 is connected at an end 21b to the cartridge tray 10 through a spring 22. Thus, the end 21c of the tension arm 21 is pulled downwardly by the spring 22, and accordingly, the tension arm 21 and hence the arm plate 17 is kept stationary while the motor 19 is turned off.

The illustrated conventional apparatus operates as follows. When the motor 19 causes the motor crank 18 to rotate about the point 18a by 180 degrees, namely, when the crank arm 18 rotates from a position A illustrated in FIG. 1 to a position B illustrated in FIG. 2, the motor arm 20 extends downwardly towards the deck 12, which causes the tension arm 21 and the arm plate 17 to rotate about the point 21a and the end 17a, respectively, towards the deck 12. As the arm plate 17 rotates, the arm plate 17 makes contact with the cartridge 11 and then pushes the cartridge 11 downwardly.

Thus, the cartridge 11 together with the cartridge tray 10 is pushed downwardly against the spring force exerted by the springs 13a and 13b, and then the pin 15 fits into the positioning groove 14 of the cartridge 11 through the through hole 16 of the cartridge tray 10. Thus, the cartridge 11 is loaded into the deck 12 in place.

In the above described conventional apparatus, the arm plate 17 is designed to make contact with and push the cartridge 11 at a central region of the cartridge 11. Hence, there often arises a problem that a summit of the pin 15 abuts a corner of the positioning groove 14, and thus the cartridge 11 is stuck on the pin 15, as illustrated in FIG. 2. When such a problem occurs, the cartridge 11 has to be reloaded until the pin 15 just fits into the positioning groove 14.

U.S. Pat. No. 5,018,031 issued on May 21, 1991 to Wada has suggested a similar apparatus for loading a cartridge into a deck. In the apparatus, a push rod which is designed to make pivotal movement in synchronization with a motor pushes a cartridge to thereby load the cartridge into a deck. However, this apparatus also may cause the same problem as mentioned above.

SUMMARY OF THE INVENTION

In view of the above mentioned problem of the conventional apparatuses, it is an object of the present invention to provide an apparatus and a method for avoiding a cartridge from being stuck on a pin projecting from a deck, and for making it possible to smoothly load a cartridge into a deck.

In one aspect, the present invention provides an apparatus for loading a cartridge into a deck, including (a) a cartridge tray designed to be movable relative to a deck and formed at a bottom surface thereof with a through hole, a cartridge being adapted to be placed on the cartridge tray, the cartridge being formed at a lower surface with a positioning groove into which a pin projecting from the deck is to be fit through the through hole of the cartridge tray when the cartridge tray is caused to move to the deck, (b) an arm plate designed to be movable towards the deck, (c) a mechanism for causing the arm plate to make contact with the cartridge and push the cartridge towards the deck until the pin fits into the positioning groove of the cartridge, and (d) a device for making contact with the cartridge before the arm plate makes contact with the cartridge, and pushing the cartridge towards the deck before the means A causes the arm plate to push the cartridge towards the deck.

For instance, the device includes a block disposed at a lower level than the arm plate, and a rod having resiliency which is connected at one end thereof to the block and fixedly connected at the other end thereof to the arm plate. In this arrangement, it is preferable for the block to make contact with and push the cartridge above the positioning groove of the cartridge.

The device may include a plurality of blocks. For instance, the device includes two blocks which are arranged to make contact with the cartridge at opposite sides of the cartridge.

In another aspect, the invention provides a method of loading a cartridge into a deck, including the steps of (a) causing at least one block to move towards and make contact with an upper surface of a cartridge placed on a cartridge tray designed to be movable relative to a deck and formed at a bottom surface thereof with a through hole, the cartridge being formed at a lower surface with a positioning groove into which a pin projecting from the deck is to be fit through the through hole of the cartridge tray when the cartridge tray is caused to move downwardly towards the deck, (b) causing the block to push the cartridge downwardly towards the deck until the pin fits into the positioning groove of the cartridge, (c) causing an arm plate to move towards and make contact with the upper surface of the cartridge at an area other than an area at which the block makes contact with the cartridge, and (d) causing the arm plate to push the cartridge downwardly towards the deck.

It is preferable that the block makes contact with the cartridge above the positioning groove of the cartridge in the step (a), and that the arm plate makes contact with the cartridge at about central area of the cartridge.

There may be prepared two blocks which are to make contact with the cartridge at opposite sides of the cartridge.

The above mentioned apparatus made in accordance with the present invention operates as follows. When the mechanism causes the arm plate to push downwardly towards the deck, the arm plate and hence the device having the block and the rod are rotated towards the cartridge. Since the block of the device is located at a lower level than the arm plate, the block first makes contact with the cartridge, preferably, above the positioning groove of the cartridge. As the arm plate and hence the device are rotated by the mechanism, the block pushes the cartridge, and hence the pin projecting from the deck first fits into the positioning groove of the cartridge. Then, the arm plate makes contact with the cartridge, and pushes the cartridge towards the deck, as the arm plate is rotated by the mechanism. Thus, the cartridge is loaded into the deck.

Since the pin first fits into the positioning groove of the cartridge, it is possible to avoid the cartridge from being stuck on the pin, and hence the cartridge can be correctly loaded into the deck.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 1:
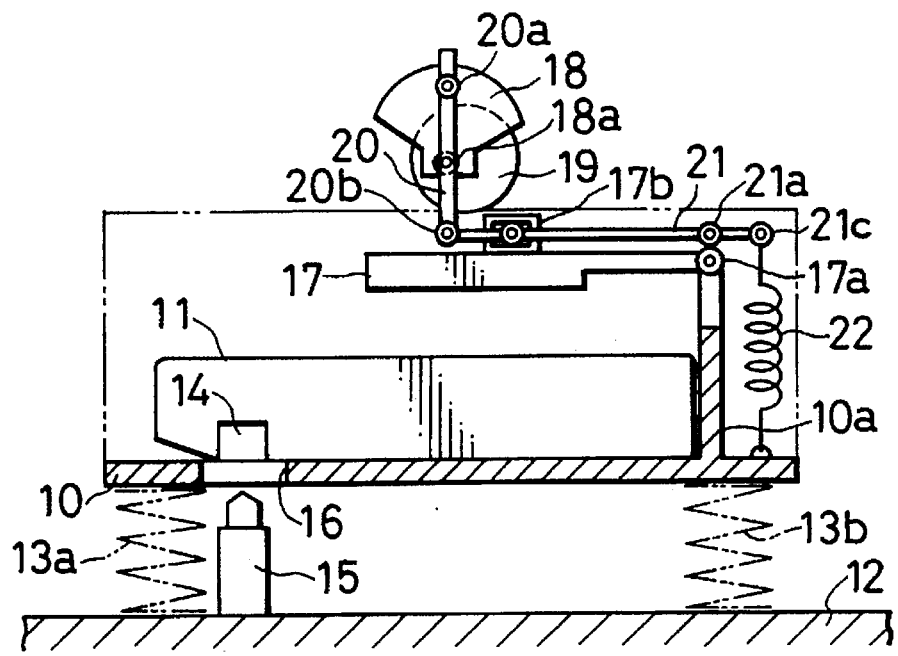
FIG. 1 is a side view illustrating a conventional apparatus for loading a cartridge into a deck.
Figure 2:
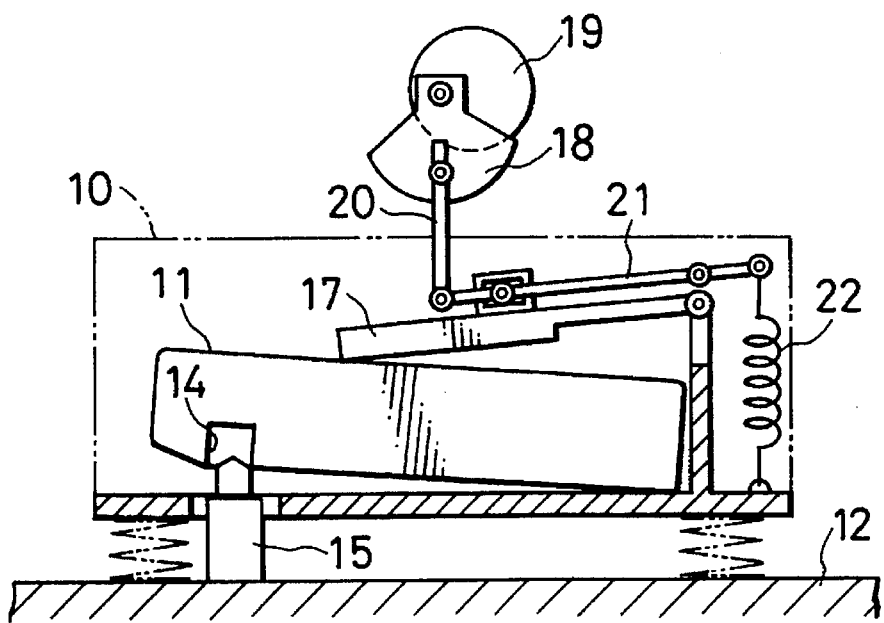
FIG. 2 is a side view illustrating the apparatus of FIG. 1 being stuck on a pin standing on a deck.

FIGS. 3 to 6 illustrate an embodiment of the apparatus made in accordance with the invention. The illustrated apparatus includes the same structure as the conventional apparatus illustrated in FIGS. 1 and 2. Elements or parts of the apparatus corresponding to those of the conventional apparatus illustrated in FIGS. 1 and 2 have been provided with the same reference numerals, and will not be explained in detail.

Figure 3:
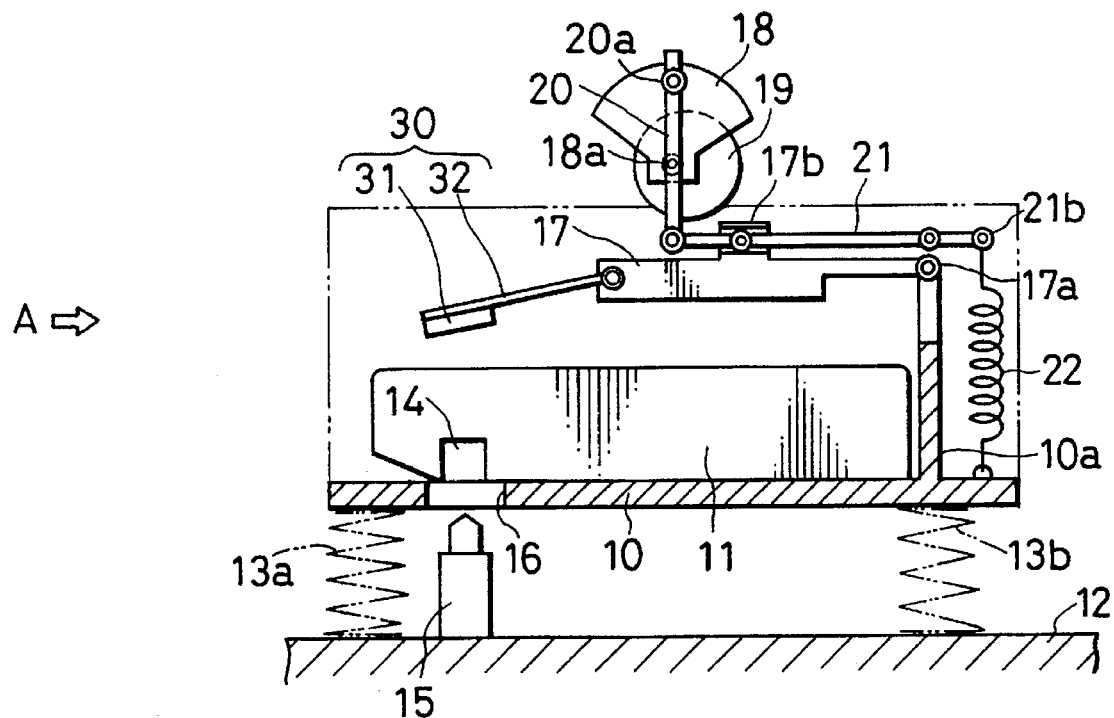
FIG. 3 is a side view illustrating an apparatus made in accordance with the embodiment of the present invention.
Figure 4:
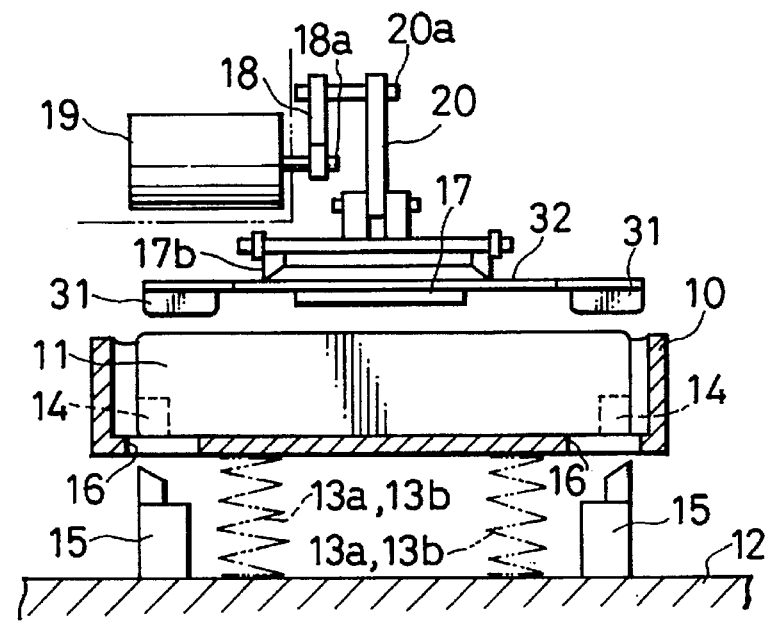
FIG. 4 is a front view of the apparatus illustrated in FIG. 3 as viewed from an arrow A of FIG. 3.

The apparatus made in accordance with the embodiment additionally includes means B; a device 30 comprising two blocks 31 and a rod 32 which is connected at one end thereof to the blocks 31 and fixedly connected at the other end thereof to the arm plate 17. As illustrated in FIGS. 3 and 4, the two blocks 31 are disposed at a lower level than the arm plate 17 in normal state, namely, while the arm plate 17 is not being pushed downwardly. The rod 32 is made of material having resiliency so that the rod 32 can be bent.

As best illustrated in FIG. 3, the blocks 31 are designed to be located just above the positioning grooves 14 and the pins 15. In addition, as illustrated in FIG. 4, the blocks 31 are disposed above opposite sides of the cartridge 11 in order to uniformly push the cartridge 11.

The apparatus of the embodiment operates as follows. When the motor 19 causes means A, the motor crank 18 to rotate about the point 18a by 180 degrees, namely, when the crank arm 18 rotates from a position A illustrated in FIG. 3 to a position B illustrated in FIG. 5, the motor arm 20 extends downwardly towards the deck 12, which causes the tension arm 21 and hence the arm plate 17 to rotate about the point 21a and the end 17a, respectively, towards the deck 12.

As the arm plate 17 is rotated, the blocks 31 make contact with the cartridge 11 above the positioning grooves 14 before the arm plate 17 makes contact with the cartridge 17. Then, as the arm plate 17 is further rotated, the blocks 31 pushes the cartridge 11 towards the deck 12, which causes the pins 15 projecting from the deck 12 to fit into the positioning grooves 14 through the through hole 16 of the cartridge tray 10. While the blocks 31 push the cartridge 11 towards the deck 12, the rod 32 is being deformed or bent because of its resiliency.

As the arm plate 17 is further rotated, the arm plate 17 makes contact with the cartridge 11 at a central region of the cartridge 11, and then pushes the cartridge 11 downwardly.

Thus, the cartridge 11 together with the cartridge tray 10 is pushed downwardly against the spring force exerted by the springs 13a and 13b, and hence the cartridge tray 10 is lowered. Then, the cartridge 11 is loaded into the deck 12 in place.

Figure 5:
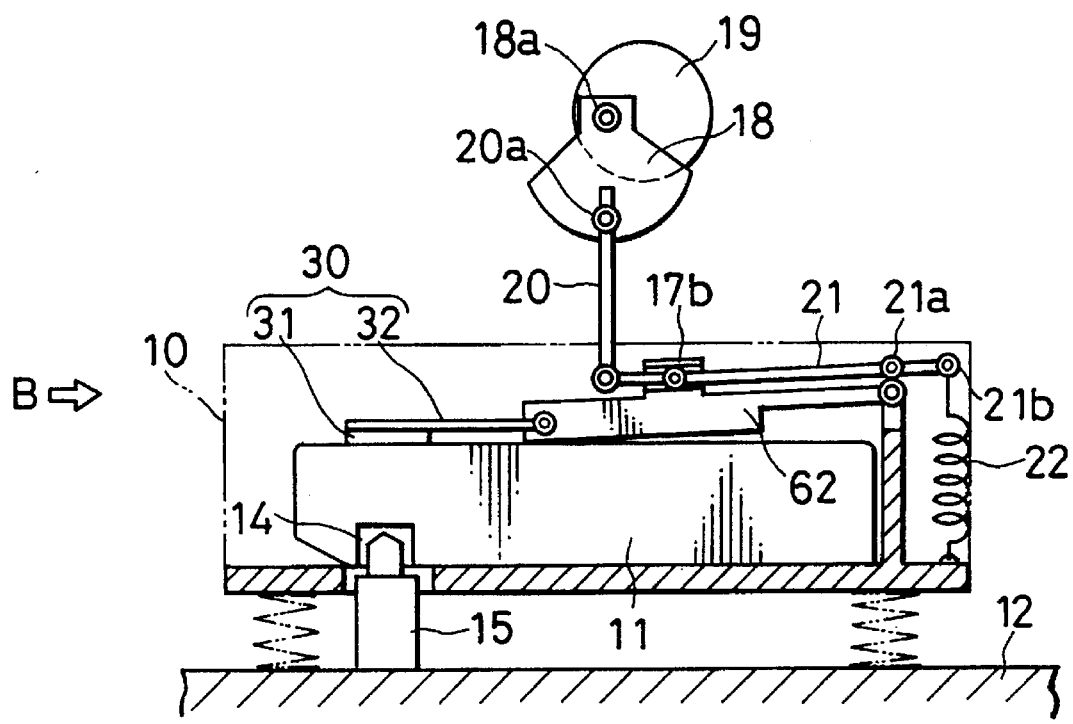
FIG. 5 is a side view illustrating the apparatus of FIG. 3.

When the cartridge 11 is to be taken out, the motor 19 rotates by 180 degrees, which causes the motor crank 18 to rotate by 180 degrees to thereby move from the position B illustrated in FIG. 5 to the position A illustrated in FIG. 3. As the motor crank 18 is rotated, the arm plate 17 is caused to pivot upwardly about the end 17a. After the arm plate 17 leaves the cartridge 13, the blocks 31 also leave the cartridge 31. Thus, when the motor 19 has rotated by 180 degrees, the apparatus returns to the position A illustrated in FIG. 3.

In accordance with the above mentioned embodiment, it is possible to load a cartridge into a deck without a cartridge being stuck on a pin. Hence, it is no longer necessary to reload a cartridge.

In the above mentioned embodiment, the apparatus includes the two blocks 31, however, it should be noted that only one block or three blocks or more may be used.

Figure 7:
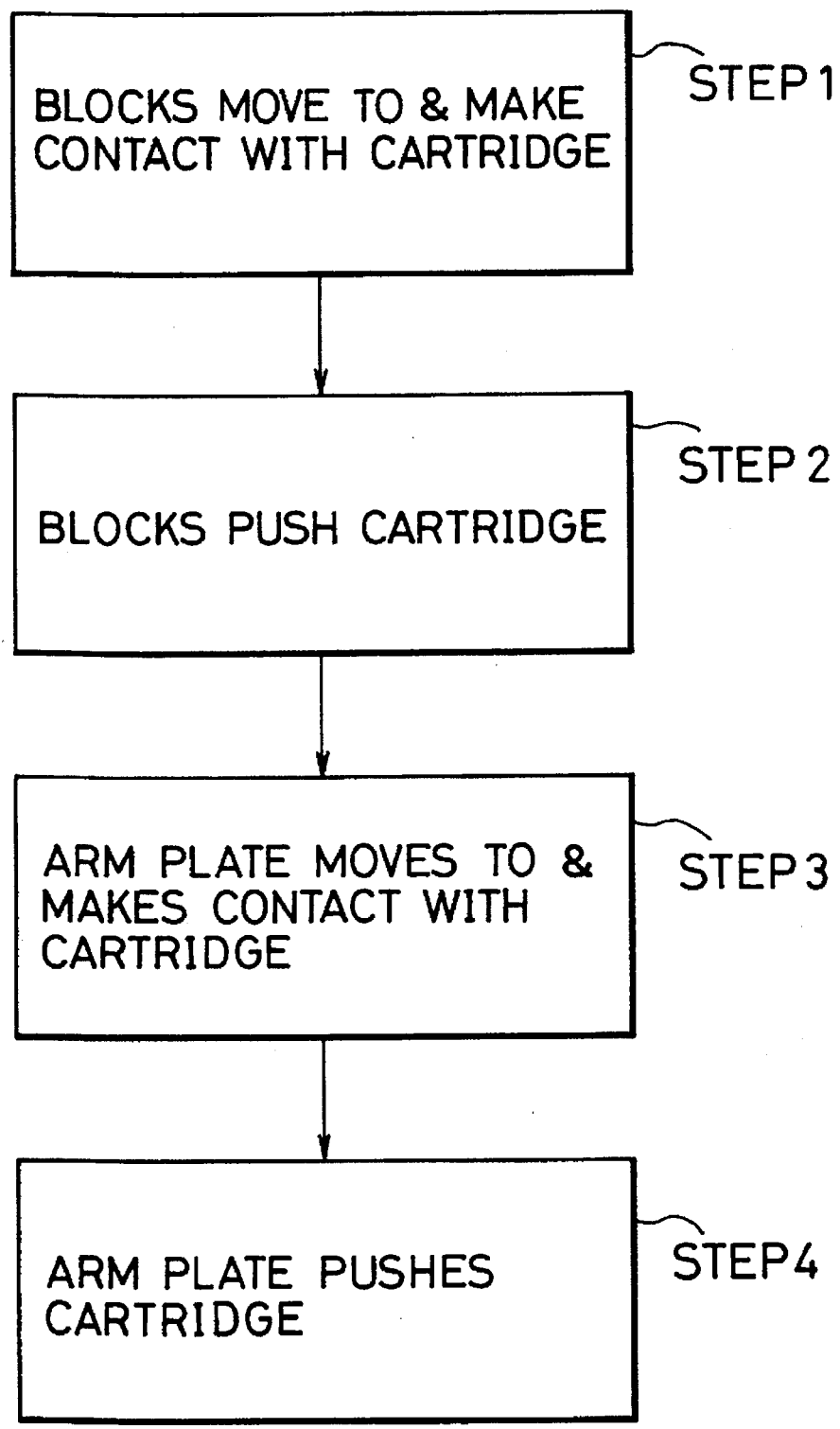
FIG. 7 is a block diagram showing steps to be carried out in accordance with the method of the present invention.

FIG. 7 shows steps to be carried out in accordance with the method of the present invention. The method described hereinbelow is to be carried out using the above mentioned apparatus.

Figure 6:
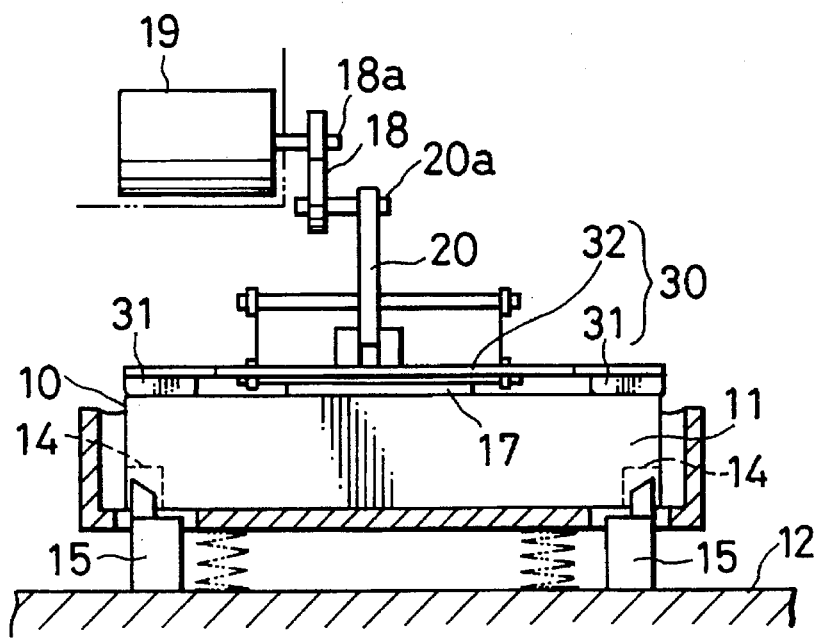
FIG. 6 is a front view of the apparatus illustrated in FIG. 5 as viewed from an arrow B of FIG. 5.

First, the two blocks 31 are caused to move towards and make contact with an upper surface of the cartridge 11 above the positioning grooves 14 in step 1 as a result of the rotation of the arm plate 17 which is caused by the rotation of the motor crank 18. The two blocks 31 are arranged to make contact with the cartridge 11 at opposite sides of the cartridge 11 in order to uniformly push the cartridge 11, as illustrated in FIG. 6.

Secondly, the blocks 31 is caused to push the cartridge 11 downwardly towards the deck 12 in step 2 until the pins 15 fit into the positioning grooves 14 as a result of the further rotation of the arm plate 17. While the blocks 31 push the cartridge 11, the rod 31 is caused to be bent or deformed because of its resiliency.

Then, the arm plate 17 approaches and makes contact with the cartridge 11 at about central region of the cartridge 11 on an upper surface thereof in step 3.

As the motor crank 18 is further rotated, the arm plate 17 pushes the cartridge 11 downwardly towards the deck 12. Thus, the cartridge tray 10 is lowered, and thus the cartridge 11 is loaded into the deck 12.

When the cartridge 11 is to be taken out, the arm plate 17 is first raised from the cartridge 11. When the arm plate 17 is raised by certain height, the blocks 31 also leave the arm plate 17. The rotation of the motor crank 18 by 180 degrees causes the arm plate 17 to return the position illustrated in FIG. 3.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. An apparatus for, loading a cartridge into a deck, comprising:

a cartridge tray designed to be movable relative to a deck and formed at a bottom surface thereof with a through hole, a cartridge being adapted to be placed on said cartridge tray, said cartridge being formed at a lower surface with a positioning groove into which a pin projecting from said deck is to be fit through said through hole of said cartridge tray when said cartridge tray is caused to move to said deck;

an arm plate designed to be movable towards said deck;

means A for causing said arm plate to make contact with said cartridge and push said cartridge towards said deck until said pin fits into said positioning groove of said cartridge; and means B for making contact with said cartridge before said arm plate makes contact with said cartridge, and pushing said cartridge towards said deck before said means A causes said arm plate to push said cartridge towards said deck.

2. The apparatus as set forth in claim 1, wherein said means B is designed to move in synchronization with said arm plate.

3. The apparatus as set forth in claim 2, wherein said means B is connected to said arm plate.

4. The apparatus as set forth in claim 1, wherein said means B makes contact with and pushes said cartridge above said positioning groove of said cartridge.

5. The apparatus as set forth in claim 1, wherein said means B comprises a block disposed at a lower level than said arm plate, and a rod having resiliency which is connected at one end thereof to said block and fixedly connected at the other end thereof to said arm plate.

6. The apparatus as set forth in claim 5, wherein said block makes contact with and pushes said cartridge above said positioning groove of said cartridge.

7. The apparatus as set forth in claim 1, wherein said means B comprises a plurality of blocks disposed at a lower level than said arm plate, and rods having resiliency each of which is connected at one end thereof to each of said blocks and fixedly connected at the other end thereof to said arm plate.

8. The apparatus as set forth in claim 7, wherein said blocks make contact with and push said cartridge above said positioning groove of said cartridge.

9. The apparatus as set forth in claim 7, wherein said means B includes two blocks which are arranged to make contact with said cartridge at opposite sides of said cartridge.

10. A method of loading a cartridge into a deck, comprising the steps of:

(a) causing at least one block to move towards and make contact with an upper surface of a cartridge placed on a cartridge tray designed to be movable relative to a deck and formed at a bottom surface thereof with a through hole, said cartridge being formed at a lower surface with a positioning groove into which a pin projecting from said deck is to be fit through said through hole of said cartridge tray when said cartridge tray is caused to move downwardly towards said deck;

(b) causing said block to push said cartridge downwardly towards said deck until said pin fits into said positioning groove of said cartridge;

(c) causing an arm plate to move towards and make contact with said upper surface of said cartridge at an area other than an area at which said block makes contact with said cartridge; and (d) causing said arm plate to push said cartridge downwardly towards said deck.

11. The method as set forth in claim 10, wherein said block makes contact with said cartridge above said positioning groove of said cartridge in said step (a).

12. The method as set forth in claim 10, wherein said arm plate makes contact with said cartridge at about central area of said cartridge.

13. The method as set forth in claim 10, wherein two blocks make contact with said cartridge above said positioning groove of said cartridge in said step (a).

14. The method as set forth in claim 13, wherein said two blocks make contact with said cartridge at opposite sides of said cartridge.

* * * * *